US012658027B2

(12) United States Patent
Gupta et al.

(10) Patent No.: US 12,658,027 B2
(45) Date of Patent: Jun. 16, 2026

(54) SYSTEMS AND METHODS FOR MITIGATING FALSE ALARMS IN A BUILDING MANAGEMENT SYSTEM

(71) Applicant: Honeywell International Inc., Charlotte, NC (US)

(72) Inventors: Anchal Gupta, Ludhiana (IN); Lalitha M. Eswara, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 123 days.

(21) Appl. No.: 18/809,042

(22) Filed: Aug. 19, 2024

(65) Prior Publication Data

US 2026/0051240 A1 Feb. 19, 2026

(51) Int. Cl.
*G08B 29/18* (2006.01)
*G06N 20/00* (2019.01)

(52) U.S. Cl.
CPC ........... *G08B 29/185* (2013.01); *G06N 20/00* (2019.01)

(58) Field of Classification Search
CPC .............................. G08B 29/185; G06N 20/00
See application file for complete search history.

(56) References Cited

U.S. PATENT DOCUMENTS

| 10,607,478 B1 | 3/2020 | Stewart et al. | |
| 11,422,547 B2 * | 8/2022 | Schuster | G05B 13/027 |

| 2020/0166232 A1 * | 5/2020 | Zhang | G08B 25/008 |
| 2020/0202221 A1 | 6/2020 | Wang et al. | |
| 2020/0210804 A1 * | 7/2020 | Lu | G06F 16/9035 |
| 2022/0157138 A1 | 5/2022 | Metzler et al. | |
| 2023/0230469 A1 | 7/2023 | Schubert et al. | |
| 2024/0345554 A1 * | 10/2024 | Brown | G05B 15/02 |
| 2024/0345573 A1 * | 10/2024 | Goyal | G05B 23/0281 |

FOREIGN PATENT DOCUMENTS

| WO | 2022/182345 A1 | 9/2022 | |
| WO | WO-2023198282 A1 * | 10/2023 | B25J 9/163 |

OTHER PUBLICATIONS

Chenna, S., "Exploring the Synergy of Generative and Distributed AI in Multi-agent Systems", SSRN, Oct. 30, 2023, 6 pages.

(Continued)

*Primary Examiner* — Rufus C Point
(74) *Attorney, Agent, or Firm* — Seager, Tufte & Wickhem, LLP

(57) ABSTRACT

False alarms may be mitigated in a Building Management System (BMS). Domain knowledge is received, as are a plurality of alarms. Some alarms are removed based at least in part on the domain knowledge, resulting in a shortlist of potential false alarms. A generative Artificial Intelligence (AI) model is applied to these alarms, simulating a virtual scenario for each alarm while considering the respective alarm as a true alarm. A discriminator AI Model is applied to determine whether the simulated virtual scenario for each alarm is probable or not. When the simulated virtual scenario is determined to be not probable, the respective alarm is classified as a false alarm and when the simulated virtual scenario is determined to be probable, the respective alarm is classified as a true alarm.

20 Claims, 7 Drawing Sheets

(56)     References Cited

OTHER PUBLICATIONS

Hall, S., "Case Study: Revolutionizing IT Monitoring with Generative AI and Smart Alerts", Transforming It With Generative AI Smart Alerts, available online at: <https://www.linkedin.com/pulse/case-study-revolutionizing-monitoring-generative-ai-hall-mba-cspo--d7wgc/?trackingId=ie3UsqIBReuryEltTLMH%2Bg%3D%3D>, Jan. 31, 2024, 12 pages.

Hong, S., et al., "MetaGPT: Meta Programming for A Multi-Agent Collaborative Framework", arXiv:2308.00352 [cs.AI], Nov. 6, 2023, 26 pages.

Hu, W., et al., "A priority-aware sequential pattern mining method for detection of compact patterns from alarm floods", Journal of Process Control, vol. 129, Sep. 2023, 14 pages.

Li, B., et al., "A semi-supervised approach to fault detection and diagnosis for building HVAC systems based on the modified generative adversarial network", Energy and Buildings, vol. 246, Sep. 1, 2021, 15 pages.

Li, D., et al., "MAD-GAN: Multivariate Anomaly Detection for Time Series Data with Generative Adversarial Networks", Lecture Notes in Computer Science, vol. 11730, Sep. 9, 2019, 17 pages.

Standen, B., "Tackling alarm overload: AI for smarter facility management", Brainbox AI, available online at: <https://brainboxai.com/en/articles/tackling-alarm-overload-ai-for-smarter-facility-management>, retrieved on Oct. 10, 2024, 8 pages.

Weng, Y., et al., "Multi-Agent-Based Unsupervised Detection of Energy Consumption Anomalies on Smart Campus", Novel Learning Applications and Services for Smart Campus, vol. 7, Nov. 29, 2018, 10 pages.

Wikipedia, "AutoGPT", available online at : <https://en.wikipedia.org/wiki/AutoGPT>, Sep. 23, 2024, 4 pages.

Wu, Q., et al., "AutoGen: Enabling Next-Gen LLM Applications via Multi-Agent Conversation", arXiv:2308.08155, Oct. 3, 2023, 43 pages.

Tamascelli, Nicola, et al., "Online Classification of Alarm Floods Using a Word2vec Algorithm," IECON 2023—49th Annual Conference of the IEEE Industrial Electronics Society, IEEE, Oct. 16, 2023, pp. 1-6, XP034469545, DOI: 10.1109/IECON51785.2023.10312435 [retrieved on Nov. 16, 2023].

* cited by examiner

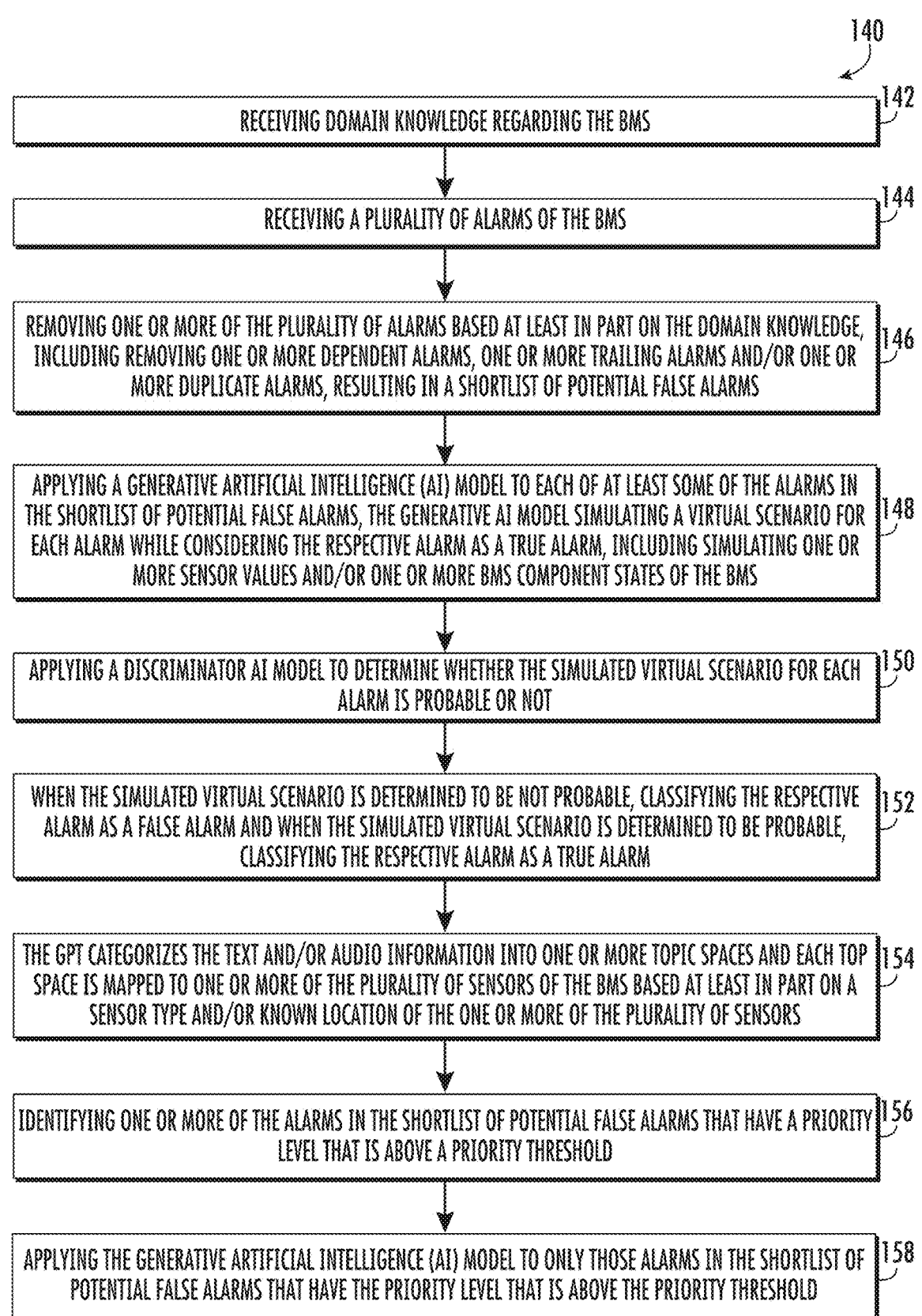

140

142 RECEIVING DOMAIN KNOWLEDGE REGARDING THE BMS

144 RECEIVING A PLURALITY OF ALARMS OF THE BMS

146 REMOVING ONE OR MORE OF THE PLURALITY OF ALARMS BASED AT LEAST IN PART ON THE DOMAIN KNOWLEDGE, INCLUDING REMOVING ONE OR MORE DEPENDENT ALARMS, ONE OR MORE TRAILING ALARMS AND/OR ONE OR MORE DUPLICATE ALARMS, RESULTING IN A SHORTLIST OF POTENTIAL FALSE ALARMS

148 APPLYING A GENERATIVE ARTIFICIAL INTELLIGENCE (AI) MODEL TO EACH OF AT LEAST SOME OF THE ALARMS IN THE SHORTLIST OF POTENTIAL FALSE ALARMS, THE GENERATIVE AI MODEL SIMULATING A VIRTUAL SCENARIO FOR EACH ALARM WHILE CONSIDERING THE RESPECTIVE ALARM AS A TRUE ALARM, INCLUDING SIMULATING ONE OR MORE SENSOR VALUES AND/OR ONE OR MORE BMS COMPONENT STATES OF THE BMS

150 APPLYING A DISCRIMINATOR AI MODEL TO DETERMINE WHETHER THE SIMULATED VIRTUAL SCENARIO FOR EACH ALARM IS PROBABLE OR NOT

152 WHEN THE SIMULATED VIRTUAL SCENARIO IS DETERMINED TO BE NOT PROBABLE, CLASSIFYING THE RESPECTIVE ALARM AS A FALSE ALARM AND WHEN THE SIMULATED VIRTUAL SCENARIO IS DETERMINED TO BE PROBABLE, CLASSIFYING THE RESPECTIVE ALARM AS A TRUE ALARM

154 THE GPT CATEGORIZES THE TEXT AND/OR AUDIO INFORMATION INTO ONE OR MORE TOPIC SPACES AND EACH TOP SPACE IS MAPPED TO ONE OR MORE OF THE PLURALITY OF SENSORS OF THE BMS BASED AT LEAST IN PART ON A SENSOR TYPE AND/OR KNOWN LOCATION OF THE ONE OR MORE OF THE PLURALITY OF SENSORS

156 IDENTIFYING ONE OR MORE OF THE ALARMS IN THE SHORTLIST OF POTENTIAL FALSE ALARMS THAT HAVE A PRIORITY LEVEL THAT IS ABOVE A PRIORITY THRESHOLD

158 APPLYING THE GENERATIVE ARTIFICIAL INTELLIGENCE (AI) MODEL TO ONLY THOSE ALARMS IN THE SHORTLIST OF POTENTIAL FALSE ALARMS THAT HAVE THE PRIORITY LEVEL THAT IS ABOVE THE PRIORITY THRESHOLD

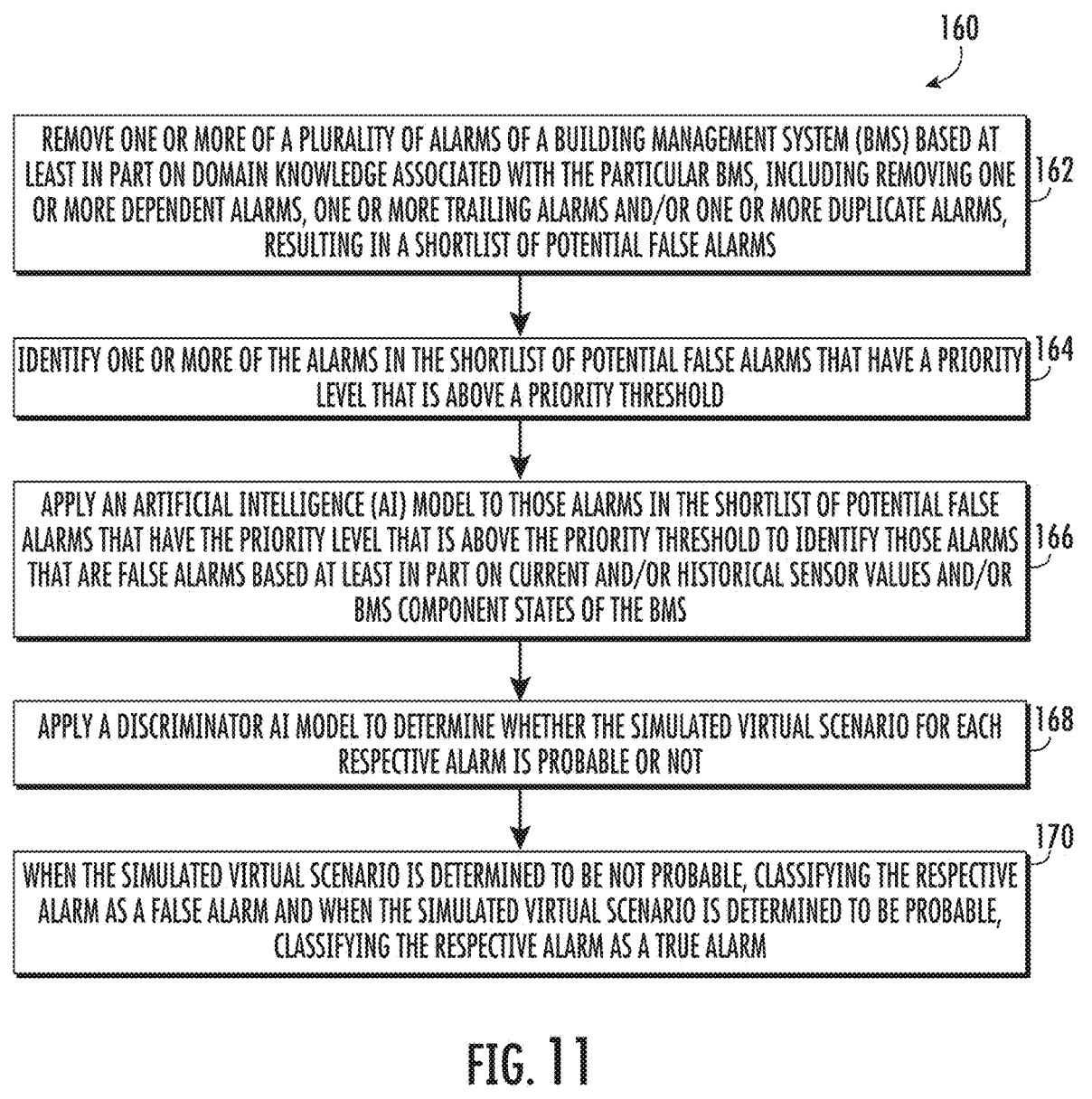

REMOVE ONE OR MORE OF A PLURALITY OF ALARMS OF A BUILDING MANAGEMENT SYSTEM (BMS) BASED AT LEAST IN PART ON DOMAIN KNOWLEDGE ASSOCIATED WITH THE PARTICULAR BMS, INCLUDING REMOVING ONE OR MORE DEPENDENT ALARMS, ONE OR MORE TRAILING ALARMS AND/OR ONE OR MORE DUPLICATE ALARMS, RESULTING IN A SHORTLIST OF POTENTIAL FALSE ALARMS — 162

IDENTIFY ONE OR MORE OF THE ALARMS IN THE SHORTLIST OF POTENTIAL FALSE ALARMS THAT HAVE A PRIORITY LEVEL THAT IS ABOVE A PRIORITY THRESHOLD — 164

APPLY AN ARTIFICIAL INTELLIGENCE (AI) MODEL TO THOSE ALARMS IN THE SHORTLIST OF POTENTIAL FALSE ALARMS THAT HAVE THE PRIORITY LEVEL THAT IS ABOVE THE PRIORITY THRESHOLD TO IDENTIFY THOSE ALARMS THAT ARE FALSE ALARMS BASED AT LEAST IN PART ON CURRENT AND/OR HISTORICAL SENSOR VALUES AND/OR BMS COMPONENT STATES OF THE BMS — 166

APPLY A DISCRIMINATOR AI MODEL TO DETERMINE WHETHER THE SIMULATED VIRTUAL SCENARIO FOR EACH RESPECTIVE ALARM IS PROBABLE OR NOT — 168

WHEN THE SIMULATED VIRTUAL SCENARIO IS DETERMINED TO BE NOT PROBABLE, CLASSIFYING THE RESPECTIVE ALARM AS A FALSE ALARM AND WHEN THE SIMULATED VIRTUAL SCENARIO IS DETERMINED TO BE PROBABLE, CLASSIFYING THE RESPECTIVE ALARM AS A TRUE ALARM — 170

FIG. 11

SYSTEMS AND METHODS FOR MITIGATING FALSE ALARMS IN A BUILDING MANAGEMENT SYSTEM

TECHNICAL FIELD

The present disclosure relates generally to building management systems and more particularly to mitigating false alarms in a building management system.

BACKGROUND

Building Management Systems are systems that control and/or monitor a building or other facility. Building Management Systems may include, for example, an HVAC system, a security, a video monitoring system, an access control system, a fire system, and/or any other suitable Building Control System. In many cases, a Building Management System raises an alarm when an abnormality is detected in the building and/or an abnormality is detected in the operation of the Building Management System. The alarms must typically be acknowledged and/or otherwise addressed by an operator or other personnel of the building. In some cases, the Building Management System may issue an alarm indicating that a potential issue or problem is occurring even though no such issue or problem is actually occurring. These alarms can be referred to as false alarms. When a false alarm occurs, an operator typically needs to respond to the false alarm, which can waste considerable time of the operator and can pull the operator's attention away from actual true alarms. What would be desirable are methods and systems for automatically determining whether an alarm is a false alarm or a true alarm.

SUMMARY

The present disclosure relates generally to building management systems and more particularly to mitigating false alarms in a building management system. An example may be found in a method for mitigating false alarms of a Building Management System (BMS) of a facility, wherein the BMS includes a plurality of BMS components placed at known locations about the facility where the plurality of BMS components include a plurality of sensors. The method includes receiving domain knowledge regarding the BMS and receiving a plurality of alarms of the BMS. One or more of the plurality of alarms are removed based at least in part on the domain knowledge, including removing one or more dependent alarms, one or more trailing alarms and/or one or more duplicate alarms, resulting in a shortlist of potential false alarms. A generative Artificial Intelligence (AI) model is applied to each of at least some of the alarms in the shortlist of potential false alarms, the generative AI model simulating a virtual scenario for each alarm while considering the respective alarm as a true alarm, including simulating one or more sensor values and/or one or more BMS component states of the BMS. A discriminator AI Model is applied to determine whether the simulated virtual scenario for each alarm is probable of not. When the simulated virtual scenario is determined to be not probable, the respective alarm is classified as a false alarm and when the simulated virtual scenario is determined to be probable, the respective alarm is classified as a true alarm.

Another example may be found in a false alarm mitigation system for mitigating false alarms of a Building Management System (BMS) of a facility, wherein the BMS includes a plurality of BMS components placed at known locations about the facility where the plurality of BMS components include a plurality of sensors. The false alarm mitigation system includes a memory for storing domain knowledge associated with the BMS, wherein the domain knowledge includes domain knowledge from each of one or more BMS domains. The false alarm mitigation system includes an input for receiving a plurality of alarms of the BMS and a controller that is operative coupled to the memory and the input. The controller is configured to apply a generative Artificial Intelligence (AI) model to each of at least some of the alarms using domain knowledge from each of one or more BMS domains, the Generative AI model simulating a virtual scenario for each alarm while considering the respective alarm as a true alarm, including simulating one or more sensor values and/or one or more BMS component states of the BMS. The controller is configured to apply a discriminator AI Model to determine whether the simulated virtual scenario for each alarm is probable or not. When the simulated virtual scenario is determined to be not probable, the controller is configured to classify the respective alarm as a false alarm and when the simulated virtual scenario is determined to be probable, the controller is configured to classify the respective alarm as a true alarm.

Another example may be found in a non-transitory computer readable medium storing instructions. When the instructions are executed by one or more processors, the one or more processors are caused to remove one or more of a plurality of alarms of a Building Management System (BMS) based at least in part on domain knowledge associated with the particular BMS, including removing one or more dependent alarms, one or more trailing alarms and/or one or more duplicate alarms, resulting in a shortlist of potential false alarms. The one or more processors are caused to identify one or more of the alarms in the shortlist of potential false alarms that have a priority level that is above a priority threshold. The one or more processors are caused to apply an Artificial Intelligence (AI) model to those alarms in the shortlist of potential false alarms that have the priority level that is above the priority threshold to identify those alarms that are false alarms based at least in part on current and/or historical sensor values and/or BMS component states of the BMS.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 10 is a flow diagram showing an illustrative method for mitigating false alarms; and FIG. 11 is a flow diagram showing an illustrative series of steps that may be carried out by one or more processors executing instructions stored on a non-transitory computer readable medium.

Figure 1:
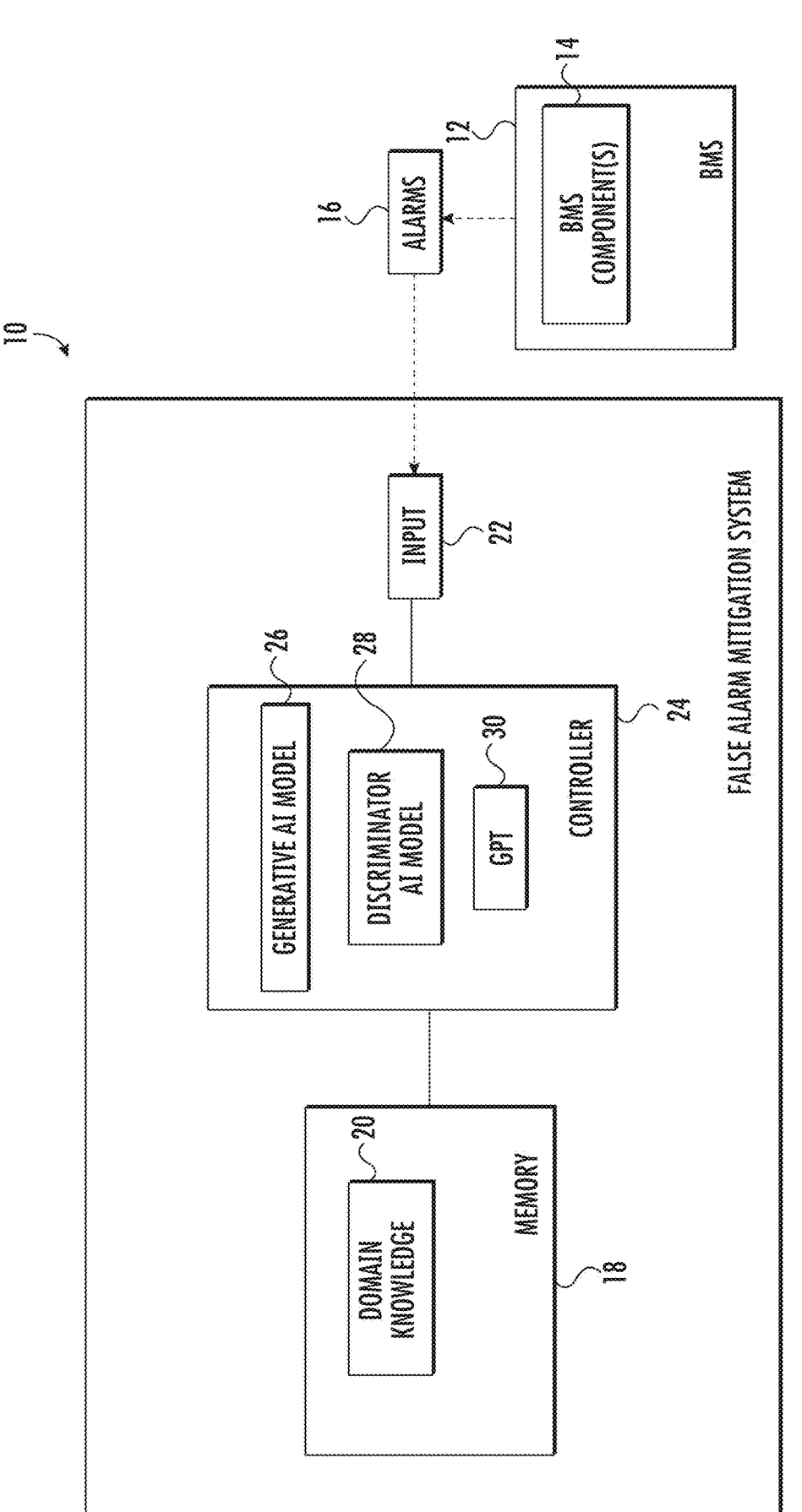
FIG. 1 is a schematic block diagram showing an illustrative false alarm mitigation system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative false alarm mitigation system 10. The illustrative false alarm mitigation system 10 is configured for mitigating false alarms of a Building Management System (BMS) 12 within a facility. The BMS 12 includes a number of BMS components 14 that are placed at known locations around the facility. In some cases, the BMS components 14 include a number of sensors such as but not limited to window open sensors, door open sensors, glass break detectors, motion detectors, fire sensors, smoke sensors, gas sensors, temperature sensors, humidity sensors and the like. The sensors may include video cameras and associated video analytics algorithms. In some cases, some or all of the sensors may be battery-powered. The BMS components 14 may detect conditions from which one or more alarms 16 may be generated. The alarms 16 may be provided to the false alarm mitigation system 10. As will be appreciated, some of the alarms 16 may be false alarms, meaning that no problem is occurring and it may simply be a sensor error or other condition, and some of the alarms 16 may be true alarms, meaning that there is a problem occurring. The false alarm mitigation system 10 processes the alarms 16 to determine which of the alarms 16 are false alarms and which are true alarms.

In the example shown, the false alarm mitigation system 10 may include a memory 18 that stores domain knowledge 20 that is associated with the BMS 12. In some cases, the domain knowledge 20 may include domain knowledge from each of one or more BMS domains. For example, the domain knowledge 20 may include domain knowledge for a security system of the facility, domain knowledge for an HVAC system of the facility, domain knowledge for a fire system of the facility, and/or domain knowledge for an access control system of the building. These are just examples. The domain knowledge may capture a type of each component, location information of each component, performance characteristics of each component, expected relationships between components, relationships between alarms, states and/or sensed values of various components, and/or any other suitable domain knowledge. Using such domain knowledge, dependent alarms, trailing alarms, duplicate alarms, and other suitable relationships between alarms may be identified.

When domain knowledge is stored for two or more BMS domains, relationships can be identified between alarms of different BMS domains. For example, a first alarm of a fire system may identify a fire in a region of the facility. In response, the domain knowledge may predict that a temperature sensor of the HVAC system in the region will sense an increase in temperature. This is just one example. It is contemplated that these and other relationship may be captured in the stored domain knowledge. In some cases, some or all of this domain knowledge may be captured in a set of domain rules. In some cases, some or all of this domain knowledge may be learned via an Artificial Intelligence model that is trained over an operational time of the BMS system.

The illustrative false alarm mitigation system 10 includes an input 22 for receiving the alarms 16 from the BMS 12. In some cases, the input 22 may be a computer port that is able to receive information from a remote source. As an example, the input 22 may be an Ethernet port. In some cases, the input 22 may be considered as being a logical input, or any other type of input. A controller 24 is operatively coupled to the memory 18 and to the input 22. In some cases, the controller 24 may be considered as including a generative Artificial Intelligence (AI) model 26, a discriminator Artificial Intelligence (AI) model 28 and a Generative Pre-trained Transformer (GPT) 30. In some cases, one or more of the generative AI model 26, the discriminator AI model 28 and the GPT 30 may be stored within the memory 18. In some cases, one or more of the generative AI model 26, the discriminator AI model 28 and the GPT 30 may be stored in a remote or cloud-based server (not shown) that is in communication with the controller 24.

In one example, the controller 24 is configured to apply the generative AI model 26 to each of at least some of the alarms 16, sometimes using the domain knowledge 20 from one or more of the BMS domains. The generative AI model 26 simulates a virtual scenario for each alarm 16 while considering the respective alarm 16 as a true alarm, including simulating one or more sensor values and/or one or more BMS component states of the BMS 12. The controller 24 applies the discriminator AI Model 28 to determine whether the simulated virtual scenario for each alarm is probable or not. When the simulated virtual scenario is determined to be not probable (e.g. less than 90 percent chance of occurring, less than 80 percent chance of occurring, less than 60 percent chance of occurring, less than 50 percent chance of occurring, or less than other threshold chance of occurring), the controller 24 is configured to classify the respective alarm 16 as a false alarm. When the simulated virtual scenario is determined to be probable, the controller 24 is configured to classify the respective alarm as a true alarm.

In some cases, the controller 24 may be configured to remove one or more of the plurality of alarms 16 based at least in part on the domain knowledge 20, including removing one or more dependent alarms, one or more trailing alarms and/or one or more duplicate alarms, resulting in a shortlist of potential false alarms, and to apply the generative AI model 26 to each of the alarms in the shortlist of potential false alarms (rather than all of the alarms 16). In some cases, the controller 24 may be configured to identify one or more of the alarms in the shortlist of potential false alarms that have a priority level that is above a priority threshold, and to apply the generative AI model 26 to only those alarms in the shortlist of potential false alarms that have the priority level that is above the priority threshold. In some cases, the controller 24 may be configured to determine whether the simulated virtual scenario for each alarm is probable of not by determining whether the simulated one or more sensor values and/or one or more BMS component states of the BMS 12 are probable given one or more current sensor values and/or one or more current BMS component states. For example, if a fire alarm is triggered in a region of the facility, the simulated virtual scenario may predict that a temperature sensor in the region will detect an elevated temperature and a smoke sensor in the region will detect an elevated smoke level. However, if the temperature sensor does not detect an elevated temperature in the region and the smoke sensor does not detect an elevated smoke level in the region, the simulated virtual scenario may be determined to not be probable. As such, the fire alarm may be categorized as a false alarm.

In some cases, the controller 24 may be configured to receive text and/or audio information in a natural language format and to provide the text and/or audio information to a Generative Pre-trained Transformer (GPT) 30 to convert the text and/or audio information into the domain knowledge 20. In some instances, the GPT 30 may categorize the text and/or audio information into one or more topic spaces, and the controller 24 may be configured to map each topic space to one or more of the plurality of sensors/components of the BMS 12 based at least in part on a sensor/component type and/or known location of the one or more of the plurality of sensors/components.

Figures 2, 3:
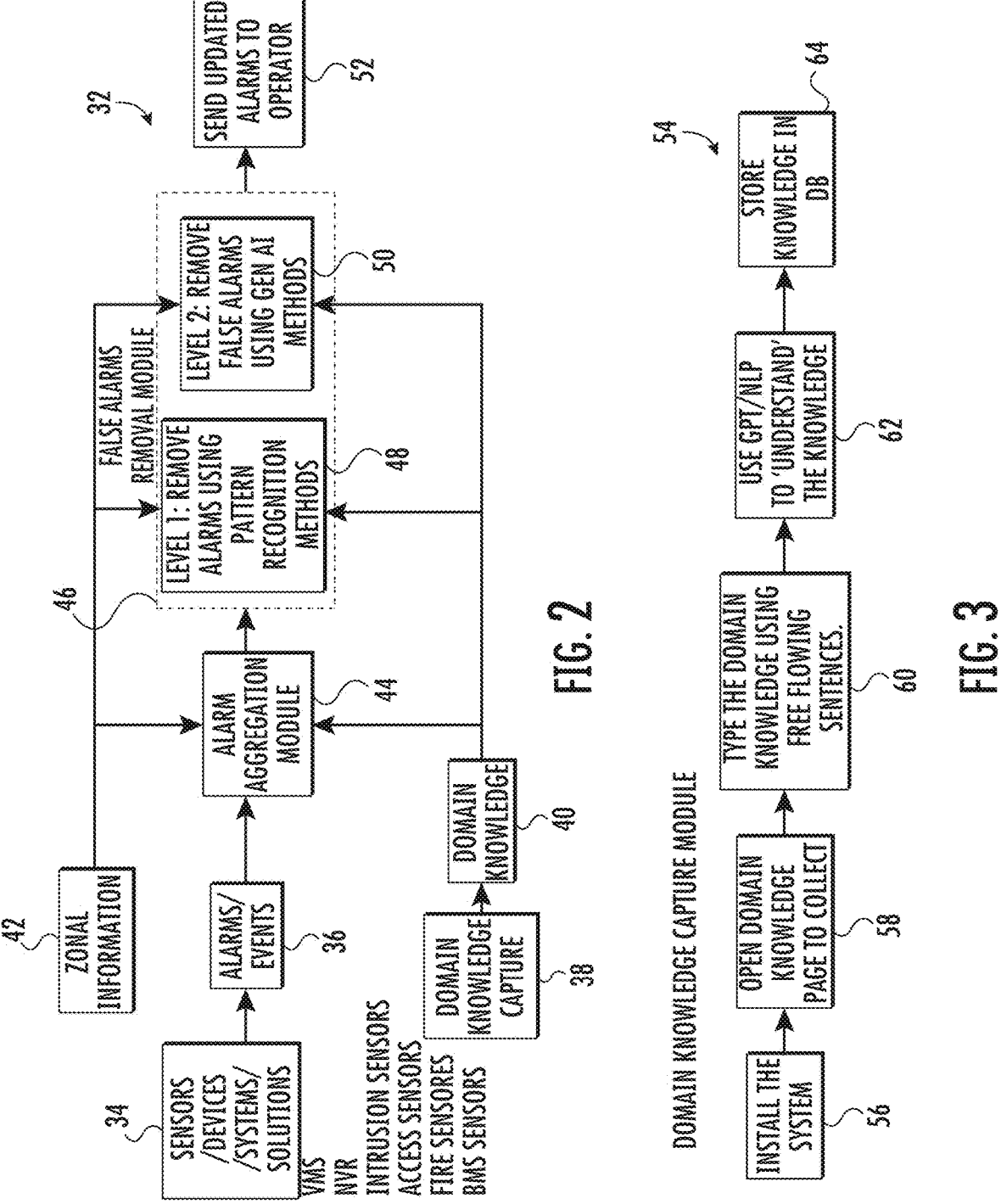
FIG. 2 is a flow diagram showing an illustrative method.
FIG. 3 is a flow diagram showing an illustrative method.

FIG. 2 is a flow diagram showing an illustrative method 32 that may be carried out using the false alarm mitigation system 10. The method 32 begins at block 34, where sensors and/or other devices output an indication of an alarm. Alarms and events are shown at block 36. At block 38, domain knowledge is captured, resulting in domain knowledge as shown at block 40. This may be considered an example of the domain knowledge 20 shown in FIG. 1. Zonal information, as indicated at block 42, includes additional domain knowledge regarding the facility including what equipment is in each zone. Information from the zonal information block 42, the alarms/event block 36 and the domain knowledge block 40 are provided to each of an alarm aggregation module 44 and a false alarms removal module 46.

The false alarms removal module 46 includes a level one block 48 and a level two block 50. The level one block 48 utilizes pattern recognition and statistical methods, as well as domain knowledge, to eliminate at least some of the false alarms. These can include removing dependent alarms, trailing alarms and duplicate alarms. Dependent alarms are those that arise from a root alarm. Associated rule mining techniques may be used to remove dependent alarms stemming from a root alarm. Trailing alarms are those that keep coming up as alarms until the original alarm is addressed by an operator. If the trailing alarms are high priority alarms, a pop-up may be triggered to gain the operators attention. The first level filtered alarms are sent from the level one block 48 to the level two block 50, which primarily relies upon generative AI techniques that are trained to identify and simulate normal behavior and sensor values/videos/images simulation in response to one or more alarms. The level two block 50 removes more of the false alarms. After the false alarms removal module 46 eliminates at least some of the false alarms, the remaining alarms (e.g. true alarms) may be provided to an operator, as indicated at block 52. The following Figures provide additional details regarding some of the blocks in FIG. 2.

FIG. 3 is a flow diagram showing an illustrative method 54 associated with the domain knowledge capture block 38. In some cases, the domain knowledge may be captured using simple English sentences, just like how an expert would convey domain knowledge to another person. The information may be captured from either typed text or even spoken text. The text can be typed using chatbots, for example. The illustrative method 54 begins with installing the system, as indicated at block 56. A page is opened to collect the domain knowledge, as indicated at block 58. The domain knowledge is entered via the page using free flowing sentences, as indicated at block 60. GPT (Generative Pre-Trained Transformer) and NLP (Natural Language Processing) may be used to understand what is typed, as indicated at block 62. The domain knowledge thus obtained is then stored in a database, as indicated at block 64.

Figures 4, 5:
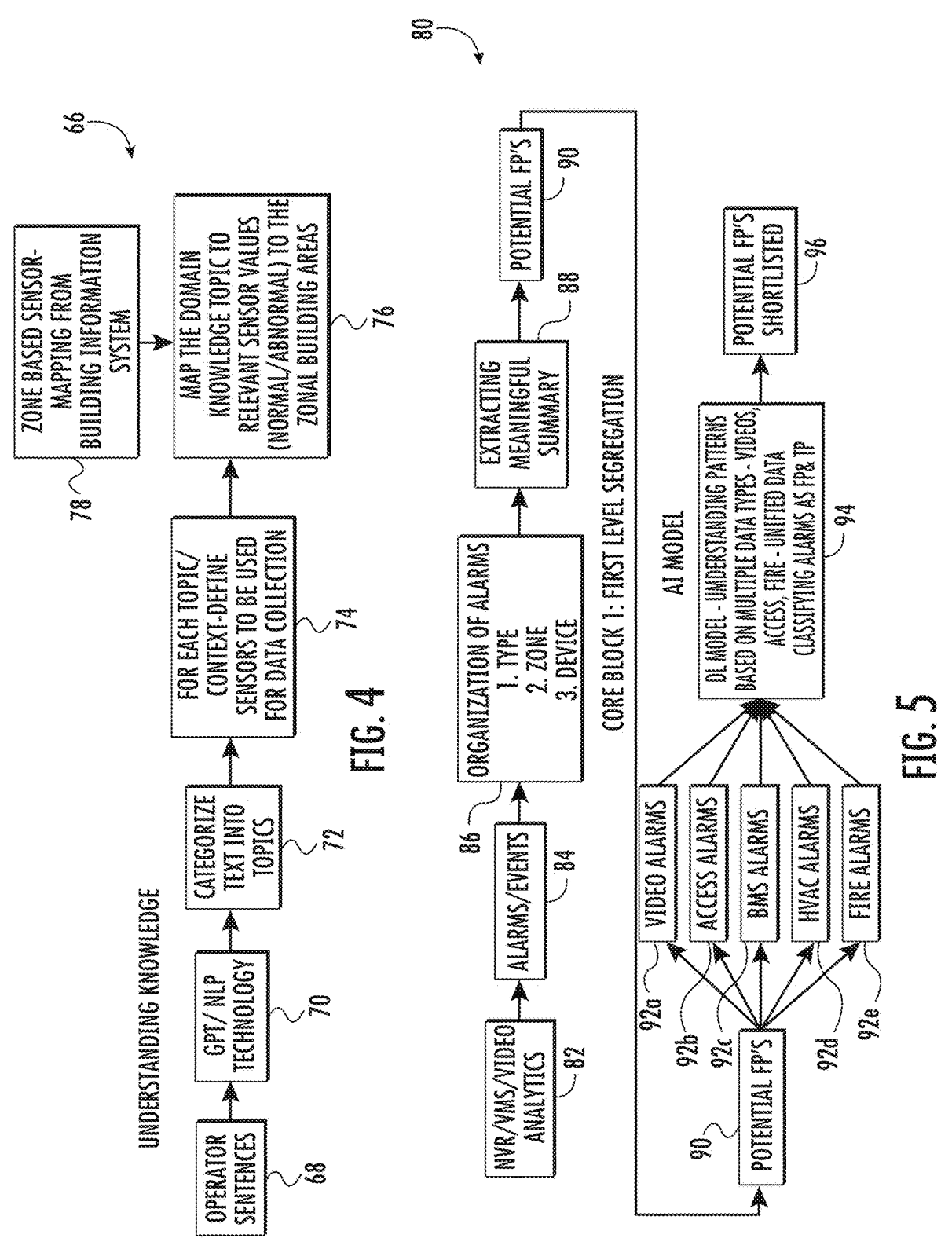
FIG. 4 is a flow diagram showing an illustrative method.
FIG. 5 is a flow diagram showing an illustrative method.

FIG. 4 is a flow diagram showing an illustrative method 66 showing how the understanding knowledge occurs at block 62 of FIG. 3. The method 66 begins at block 68, where operator sentences are entered. This may be considered equivalent to block 60 in FIG. 3. After the operator sentences are entered, they are processed with GPT and/or NLP technology, as indicated at block 70. This may be considered equivalent to block 62 in FIG. 3. Next, the text provided by block 70 are categorized into topics or contexts, as indicated at block 72. For each topic or context, sensors are selected for data collection, as indicated at block 74. Sensors are selected based on what the topic or context is, and which sensors are best able to capture appropriate information. For example, for a fire alarm, the selected sensors may include one or more of a fire sensor, a smoke detector or a camera that is positioned such that its field of view encompasses the area suspected of including a fire. Building zones and building information system information may be used to help select appropriate sensors. At block 76, the domain knowledge is mapped to relevant sensor values. The sensor values may be normal or abnormal, for example. In some cases, the mapping at block 76 takes into account information from a building information system, as indicated at block 78.

As noted, the illustrative false alarms removal module 46 includes both a level one block 48 and a level two block 50. FIG. 5 provides further details regarding the level one block 48. FIG. 5 shows a method 80 that begins with video analytics, as indicated at block 82. This yields a set of possible alarms and/or events, as indicated at block 84. The alarms are organized by one or more of type, zone and device, as indicated at block 86. A summary is extracted, as indicated at block 88. The summary yields possible false positive alarms, as indicated at block 90. The possible false positives alarms may include a number of different alarm types 92, such as video alarms 92a, access alarms 92b, BMS alarms 92c, HVAC alarms 92d and Fire alarms 92e. At block 94, pattern recognition approaches are applied to classify the alarms as either true positive (true alarm) or false positive (false alarm). This yields a shortlisted list of false positives alarms, as indicated at block 96. This can be useful to reduce the number of alarms that are processed by the level two block 50.

Figures 6, 7:
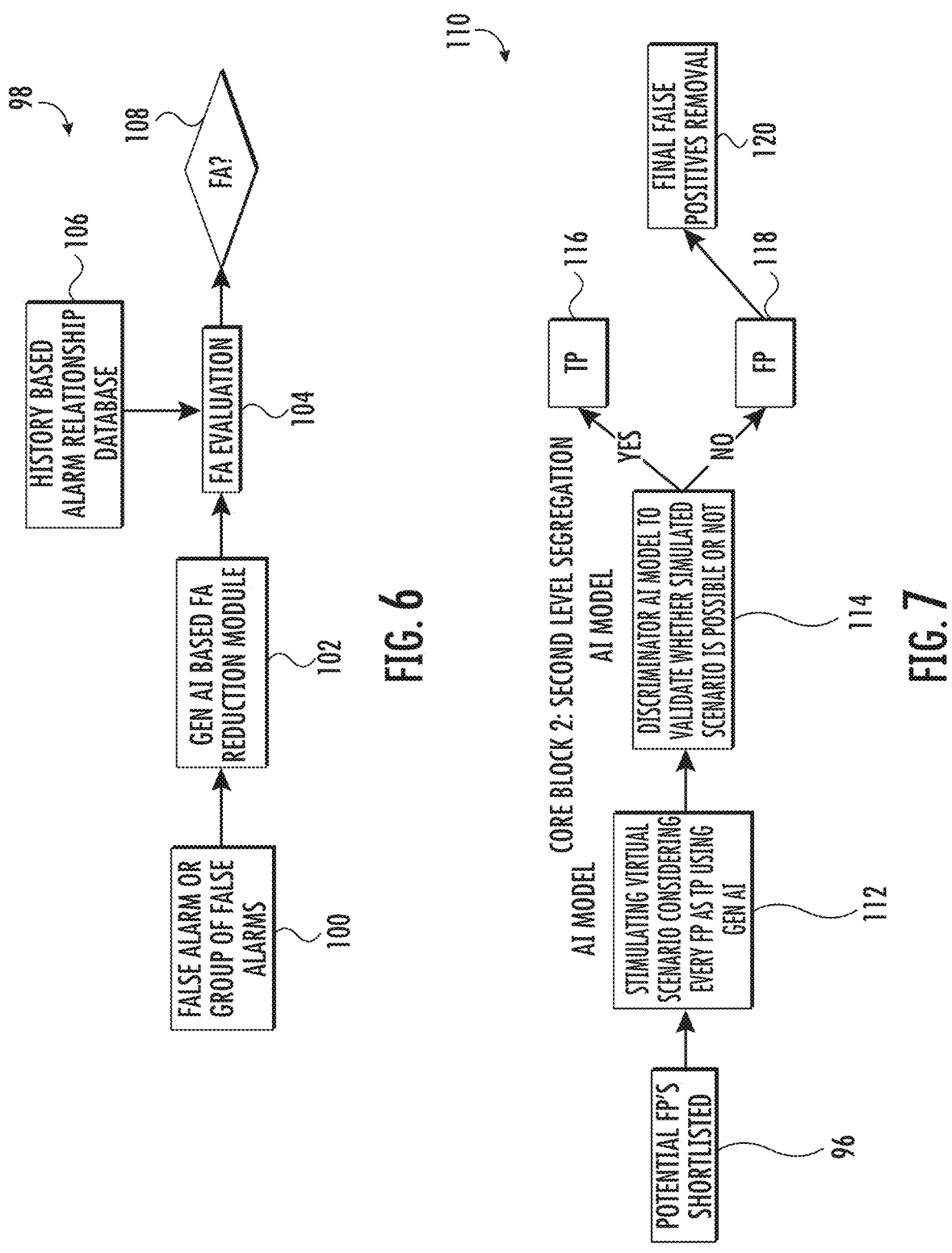
FIG. 6 is a flow diagram showing an illustrative method.
FIG. 7 is a flow diagram showing an illustrative method.

FIG. 6 shows a method 98 providing an overview of how GenAI technology may be used within the level two block 50 to evaluate false alarms that were not eliminated in the level one block 48. The method 98 begins with one or more false alarms, as indicated at block 100. A GenAI-based false alarm reduction module is deployed, as indicated at block 102. This provides an evaluation, as indicated at block 104. In some cases, the evaluation may take into account information such as history-based alarm relationships, as indicated at block 106. This includes sensor values and sensor relationships for the history of alarms, and for historical alarms that the operator has classified as true alarms. After evaluation, a decision block 108 determines whether any of the alarms are false alarms.

FIG. 7 shows a method 110 providing more details regarding the level two block 50. Beginning at block 96 (which is the output from the level one block 48), each of the false positives alarms are simulated in a virtual scenario assuming that each is a true positive alarm using a generative AI model, as indicated at block 112. Next, a discriminator AI model is applied to validate whether the virtual scenario as simulated by the generative AI model is probably or not), as indicated at block 114. If the virtual scenario is determined to be probable, the false positive(s) included in the virtual scenario are determined to be true positive alarms, as indicated at block 116. If the virtual scenario is determined to be not probable, the false positive(s) included in the virtual scenario are determined to be false positive alarms, as indicated at block 118. The false positive alarms are assembled into a final false positives list, as indicated at block 120. The false positive alarms may be removed and not shown to an operator at an operator console, thereby reducing the load on the operator. The operator's attention may focused on true alarms.

Figures 8, 9:
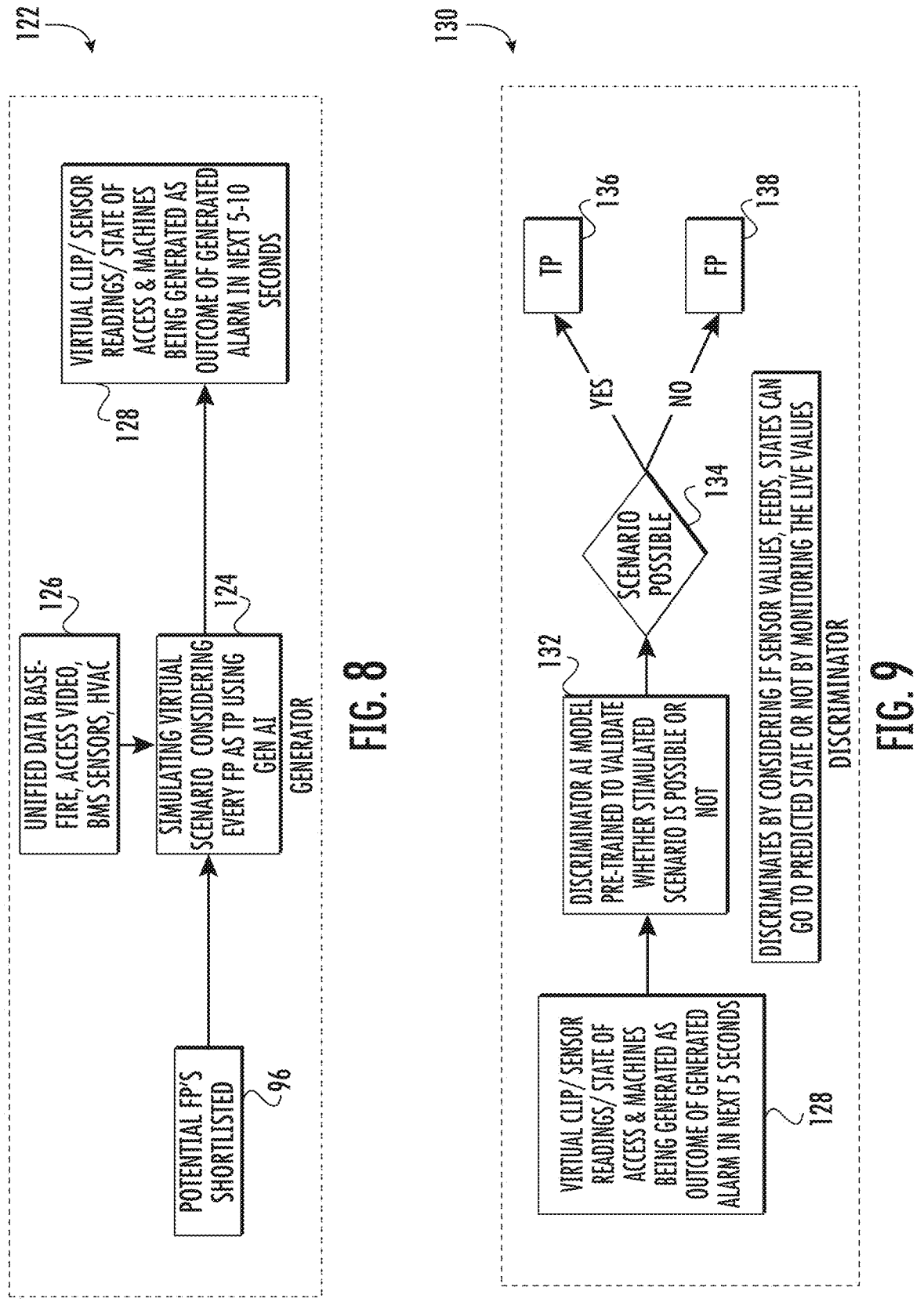
FIG. 8 is a flow diagram showing an illustrative method.
FIG. 9 is a flow diagram showing an illustrative method.

FIG. 8 shows a method 122 that provides greater detail regarding the generator AI model employed in block 112 of FIG. 7. Starting with the shortlist of potential false alarms, as indicated at block 96, control passes to block 124 where a virtual scenario assuming each of the false positives are actually true positives is simulated. In some cases, an AI model such as TPT-4 may be used for images and videos. TimeGPT or multi-parameter optimization models may also be used. The block 124 may receive information from a unified database including fire, access, video, BMS sensors and HVAC data, as indicated at block 126. As indicated at block 128, various outputs are generated. This may include virtual video clips, virtual or simulated sensors readings, and virtual or simulated alarms, for example.

FIG. 9 shows a method 130 that provides greater detail regarding the discriminator AI model employed in block 114 of FIG. 7. The method 130 begins with block 128, which is the output from FIG. 8. The discriminator AI model is pre-trained to validate whether the simulated scenario is probable or not, as indicated at block 132. In some cases, the discriminator AI model does this by evaluating whether sensor values, feeds and states can go to a predicted state or not by monitoring live values. A determination is made at decision block 134 as to whether the simulated scenario is probable or possible. If so, the false positives included as true positives in the simulated scenario are deemed to be true positives, as indicated at block 136. If not, the false positives included as true positives in the simulated scenario are deemed to be false positives, as indicated at block 138.

FIG. 10 is a flow diagram showing an illustrative method 140 for mitigating false alarms of a Building Management System (BMS) (such as the BMS 12) of a facility, wherein the BMS includes a plurality of BMS components (such as the BMS components 14) placed at known locations about the facility where the plurality of BMS components include a plurality of sensors. As an example, the plurality of sensors may include two or more of a motion sensor, a fire sensor, a smoke detector, a temperature sensor, a humidity sensor, a video camera, a door open detector, and an indoor radar sensor. The method 140 includes receiving domain knowledge regarding the BMS, as indicated at block 142, and receiving a plurality of alarms of the BMS, as indicated at block 144. In some cases, the plurality of alarms may include alarms of different alarm types and alarms from a plurality of BMS components located at different known locations about the facility. In some cases, the domain knowledge may include associations between two or more alarm types and/or alarms from two or more BMS components located at different known locations about the facility. In some cases, receiving domain knowledge may include receiving text and/or audio information in a natural language format and then providing the text and/or audio information to a Generative Pre-trained Transformer (GPT) to convert the text and/or audio information into domain knowledge. In some cases, receiving domain knowledge may include the GPT categorizing the text and/or audio information into one or more topic spaces and then mapping each topic space to one or more of the plurality of sensors of the BMS based at least in part on a sensor type and/or known location of the one or more of the plurality of sensors, as indicated at block 154. In some cases, the plurality of alarms may include alarms that occur within a predefined time window. In some cases, the plurality of alarms may include two or more of a motion alarm, a fire alarm, a smoke alarm, a temperature alarm, a humidity alarm, an intruder alarm, and a door open alarm.

One or more of the plurality of alarms are removed based at least in part on the domain knowledge, including removing one or more dependent alarms, one or more trailing alarms and/or one or more duplicate alarms, resulting in a shortlist of potential false alarms, as indicated at block 146. A generative Artificial Intelligence (AI) model is applied to each of at least some of the alarms in the shortlist of potential false alarms, the generative AI model simulating a virtual scenario for each alarm while considering the respective alarm as a true alarm, including simulating one or more sensor values and/or one or more BMS component states of the BMS, as indicated at block 148. The generative Artificial Intelligence (AI) model may be trained using historical true alarms with corresponding sensor values and/or BMS component states of the BMS. A discriminator AI Model is applied to determine whether the simulated virtual scenario for each alarm is probable or not, as indicated at block 150. In some cases, determining whether the simulated virtual scenario for each alarm is probable or not includes determining whether the simulated one or more sensor values and/or one or more BMS component states of the BMS are probable given one or more current sensor values and/or one or more current BMS component states. When the simulated virtual scenario is determined to be not probable, the respective alarm is classified as a false alarm and when the simulated virtual scenario is determined to be probable, the respective alarm is classified as a true alarm, as indicated at block 152.

In some cases, the method 140 may include identifying one or more of the alarms in the shortlist of potential false alarms that have a priority level that is above a priority threshold, as indicated at block 156. The generative Artificial Intelligence (AI) model may only be applied to those alarms in the shortlist of potential false alarms that have the priority level that is above the priority threshold, as indicated at block 158. This may focus the false alarm processing on those alarm that have a priority level that is above the priority threshold.

FIG. 11 is a flow diagram showing an illustrative series of steps 160 that may be carried out by one or more processors that are executing instructions stored on a non-transitory computer readable medium. The one or more processors may be part of the controller 24, for example. The one or more processors may be caused to remove one or more of a plurality of alarms of a Building Management System (BMS) based at least in part on domain knowledge associated with the particular BMS, including removing one or more dependent alarms, one or more trailing alarms and/or one or more duplicate alarms, resulting in a shortlist of potential false alarms, as indicated at block 162. The one or more processors may be caused to identify one or more of the alarms in the shortlist of potential false alarms that have a priority level that is above a priority threshold, as indicated at block 164. The one or more processors may be caused to apply an Artificial Intelligence (AI) model to those alarms in the shortlist of potential false alarms that have the priority level that is above the priority threshold to identify those alarms that are false alarms based at least in part on current and/or historical sensor values and/or BMS component states of the BMS, as indicated at block 166. In some cases, the Artificial Intelligence (AI) model may be configured to simulate a virtual scenario for each respective alarm while considering the respective alarm as a true alarm, including simulating one or more sensor values and/or one or more BMS component states of the BMS. In some cases, the one or more processors may be caused to apply a discriminator AI Model to determine whether the simulated virtual scenario for each respective alarm is probable or not, as indicated at block 168. When the simulated virtual scenario is determined to be not probable, the one or more processors may be caused to classify the respective alarm as a false alarm and when the simulated virtual scenario is determined to be probable, the one or more processors may be caused to the respective alarm as a true alarm, as indicated at block 170.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for mitigating false alarms of a Building Management System (BMS) of a facility, wherein the BMS includes a plurality of BMS components placed at known locations about the facility where the plurality of BMS components include a plurality of sensors, the method comprising:

receiving domain knowledge regarding the BMS;

receiving a plurality of alarms of the BMS;

removing one or more of the plurality of alarms based at least in part on the domain knowledge, including removing one or more dependent alarms, one or more trailing alarms and/or one or more duplicate alarms, resulting in a shortlist of potential false alarms;

applying a generative Artificial Intelligence (AI) model to each of at least some of the alarms in the shortlist of potential false alarms, the generative AI model simulating a virtual scenario for each alarm while considering the respective alarm as a true alarm, including simulating one or more sensor values and/or one or more BMS component states of the BMS;

applying a discriminator AI Model to determine whether the simulated virtual scenario for each alarm is probable of not; and when the simulated virtual scenario is determined to be not probable, classifying the respective alarm as a false alarm and when the simulated virtual scenario is determined to be probable, classifying the respective alarm as a true alarm.

2. The method of claim 1, wherein determining whether the simulated virtual scenario for each alarm is probable of not includes determining whether the simulated one or more sensor values and/or one or more BMS component states of the BMS are probable given one or more current sensor values and/or one or more current BMS component states.

3. The method of claim 1, wherein the plurality of alarms includes alarms of different alarm types and alarms from a plurality of BMS components located at different known locations about the facility.

4. The method of claim 3, wherein the domain knowledge includes associations between two or more alarm types and/or alarms from two or more BMS components located at different known locations about the facility.

5. The method of claim 1, wherein the plurality of alarms includes alarms that occur within a predefined time window.

6. The method of claim 3, wherein the generative Artificial Intelligence (AI) model is trained using historical true alarms with corresponding sensor values and/or BMS component states of the BMS.

7. The method of claim 1, where receiving domain knowledge includes:

receiving text and/or audio information in a natural language format; and providing the text and/or audio information to a Generative Pre-trained Transformer (GPT) to convert the text and/or audio information into the domain knowledge.

8. The method of claim 7, wherein the GPT categorizes the text and/or audio information into one or more topic spaces.

9. The method of claim 8, comprising:

mapping each topic space to one or more of the plurality of sensors of the BMS based at least in part on a sensor type and/or known location of the one or more of the plurality of sensors.

10. The method of claim 1, wherein the plurality of sensors include two or more of a motion sensor, a fire sensor, a smoke detector, a temperature sensor, a humidity sensor, a video camera, a door open detector, and an indoor radar sensor.

11. The method of claim 1, wherein the plurality of alarms include two or more of a motion alarm, a fire alarm, a smoke alarm, a temperature alarm, a humidity alarm, an intruder alarm, and a door open alarm.

12. The method of claim 1, comprising:

identifying one or more of the alarms in the shortlist of potential false alarms that have a priority level that is above a priority threshold; and applying the generative Artificial Intelligence (AI) model to only those alarms in the shortlist of potential false alarms that have the priority level that is above the priority threshold.

13. A false alarm mitigation system for mitigating false alarms of a Building Management System (BMS) of a facility, wherein the BMS includes a plurality of BMS components placed at known locations about the facility where the plurality of BMS components include a plurality of sensors, the false alarm mitigation system comprising:

a memory for storing domain knowledge associated with the BMS, wherein the domain knowledge includes domain knowledge from each of one or more BMS domains;

an input for receiving a plurality of alarms of the BMS;

a controller operative coupled to the memory and the input, the controller configured to:

apply a generative Artificial Intelligence (AI) model to each of at least some of the alarms using domain knowledge from each of one or more BMS domains, the Generative AI model simulating a virtual scenario for each alarm while considering the respective alarm as a true alarm, including simulating one or more sensor values and/or one or more BMS component states of the BMS;

apply a discriminator AI Model to determine whether the simulated virtual scenario for each alarm is probable or not; and when the simulated virtual scenario is determined to be not probable, classifying the respective alarm as a false alarm and when the simulated virtual scenario is determined to be probable, classifying the respective alarm as a true alarm.

14. The false alarm mitigation system of claim 13, wherein the controller is configured to:

remove one or more of the plurality of alarms based at least in part on the domain knowledge, including removing one or more dependent alarms, one or more trailing alarms and/or one or more duplicate alarms, resulting in a shortlist of potential false alarms; and apply the generative Artificial Intelligence (AI) model to each of the alarms in the shortlist of potential false alarms.

15. The false alarm mitigation system of claim 13, wherein the controller is configured to:

identify one or more of the alarms in the shortlist of potential false alarms that have a priority level that is above a priority threshold; and apply the generative Artificial Intelligence (AI) model to only those alarms in the shortlist of potential false alarms that have the priority level that is above the priority threshold.

16. The false alarm mitigation system of claim 13, wherein the controller is configured to determine whether the simulated virtual scenario for each alarm is probable of not by determining whether the simulated one or more sensor values and/or one or more BMS component states of the BMS are probable given one or more current sensor values and/or one or more current BMS component states.

17. The false alarm mitigation system of claim 13, wherein the controller is configured to:

receive text and/or audio information in a natural language format; and provide the text and/or audio information to a Generative Pre-trained Transformer (GPT) to convert the text and/or audio information into the domain knowledge.

18. The false alarm mitigation system of claim 17, wherein the GPT categorizes the text and/or audio information into one or more topic spaces, and the controller is configured to map each topic space to one or more of the plurality of sensors of the BMS based at least in part on a sensor type and/or known location of the one or more of the plurality of sensors.

19. A non-transitory computer readable medium storing instructions that when executed by one or more processors causes the one or more processors to:

remove one or more of a plurality of alarms of a Building Management System (BMS) based at least in part on domain knowledge associated with the particular BMS, including removing one or more dependent alarms, one or more trailing alarms and/or one or more duplicate alarms, resulting in a shortlist of potential false alarms;

identify one or more of the alarms in the shortlist of potential false alarms that have a priority level that is above a priority threshold; and apply an Artificial Intelligence (AI) model to those alarms in the shortlist of potential false alarms that have the priority level that is above the priority threshold to identify those alarms that are false alarms based at least in part on current and/or historical sensor values and/or BMS component states of the BMS.

20. The non-transitory computer readable medium of claim 19, wherein the Artificial Intelligence (AI) model is configured to simulate a virtual scenario for each respective alarm while considering the respective alarm as a true alarm, including simulating one or more sensor values and/or one or more BMS component states of the BMS, and wherein the instructions cause the one or more processors to:

apply a discriminator AI Model to determine whether the simulated virtual scenario for each respective alarm is probable or not; and when the simulated virtual scenario is determined to be not probable, classifying the respective alarm as a false alarm and when the simulated virtual scenario is determined to be probable, classifying the respective alarm as a true alarm.

* * * * *